United States Patent
Zhu et al.

(10) Patent No.: US 11,613,813 B2
(45) Date of Patent: Mar. 28, 2023

(54) LOW TEMPERATURE-CURED CORROSION INHIBITION COATING

(71) Applicant: Hamilton Sundstrand Corporation, Charlotte, NC (US)

(72) Inventors: Tianli Zhu, Glastonbury, CT (US); Weilong Zhang, Glastonbury, CT (US); Michael A. Kryzman, West Hartford, CT (US); Blair A. Smith, South Windsor, CT (US); Georgios S. Zafiris, Glastonbury, CT (US); Olivier Brucelle, Villeneuve (FR)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 349 days.

(21) Appl. No.: 16/838,378

(22) Filed: Apr. 2, 2020

(65) Prior Publication Data

US 2020/0318244 A1    Oct. 8, 2020

(30) Foreign Application Priority Data

Apr. 8, 2019 (EP) .................................. 19290022

(51) Int. Cl.
| | |
|---|---|
| *C23F 11/18* | (2006.01) |
| *F01D 5/28* | (2006.01) |
| *F02C 7/30* | (2006.01) |
| *C09D 5/10* | (2006.01) |
| *C09D 1/02* | (2006.01) |

(52) U.S. Cl.
CPC .............. *C23F 11/188* (2013.01); *C09D 1/02* (2013.01); *C09D 5/103* (2013.01); *F01D 5/288* (2013.01); *F02C 7/30* (2013.01); *F01D 5/282* (2013.01)

(58) Field of Classification Search
CPC ......... C09D 1/02; C09D 5/103; C23F 11/188; F01D 5/282; F01D 5/288; F02C 7/30
See application file for complete search history.

(56) References Cited

U.S. PATENT DOCUMENTS

| | | | |
|---|---|---|---|
| 4,119,763 A * | 10/1978 | Blair | .................... B23K 35/226 |
| | | | 428/560 |
| 8,048,215 B2 | 11/2011 | Davies et al. | |
| 10,100,203 B2 | 10/2018 | Doherty et al. | |
| 10,829,647 B2 * | 11/2020 | Zhu | ........................ C09D 5/106 |
| 2004/0016910 A1 | 1/2004 | Phelps et al. | |
| 2015/0090154 A1 | 4/2015 | Belov et al. | |
| 2015/0183998 A1 | 7/2015 | Belov et al. | |
| 2016/0257845 A1 | 9/2016 | Park et al. | |

FOREIGN PATENT DOCUMENTS

| | | | | |
|---|---|---|---|---|
| CN | 107043560 A | * | 8/2017 | ............... C09D 1/04 |
| CN | 107964351 A | | 4/2018 | |
| CN | 108929581 A | | 12/2018 | |
| CN | 111303670 A | | 6/2020 | |
| EP | 0295834 A1 | | 12/1988 | |
| EP | 2730679 A1 | | 5/2014 | |

OTHER PUBLICATIONS

Extended European Search Report issued in Application No. 19290022.3 dated Oct. 16, 2019, 6 pages.
English Machine Translation for CN111303670 (A), published: Jun. 19, 2020, 9 pages.
English Translation of CN Office Action and Search Report for Application No. 202010268507.0, dated Jun. 14, 2022 8 pages.
European Official Letter for Application No. 19290022.3, dated Sep. 12, 2022, 3 pages.
First CN Office Action and Search Report for Application No. 202010268507.0, dated Jun. 14, 2022, 7 pages.
Machine Translation of CN108929581 (A), Published: Dec. 4, 2018, 12 pages.

* cited by examiner

*Primary Examiner* — Anthony J Green

(74) *Attorney, Agent, or Firm* — Cantor Colburn LLP

(57) ABSTRACT

Disclosed is a corrosion inhibition coating, comprising: a base comprising a silicate matrix, wherein aluminum, an aluminum alloy, or a combination thereof, is present within the silicate matrix; and an inhibitor comprising: zinc molybdate, cerium citrate, magnesium metasilicate, a metal phosphate silicate, or a combination thereof, wherein a curing temperature of the corrosion inhibition coating is about 20° C. to about 190° C., preferably about 20° C. to about 120° C. Also disclosed is a substrate coated with the corrosion inhibition coating, wherein the substrate is a peened part.

16 Claims, 2 Drawing Sheets

LOW TEMPERATURE-CURED CORROSION INHIBITION COATING

CROSS REFERENCE TO RELATED APPLICATIONS

This application claims the benefit of European Application No. 19290022.3, filed Apr. 8, 2019, which is incorporated by reference in its entirety herein.

BACKGROUND

Exemplary embodiments pertain to the art of corrosion inhibition coatings, more particularly, inhibition coatings with low curing temperatures for aircraft components.

Alloys require corrosion protection in aerospace applications. Conventional sacrificial corrosion inhibition coatings are based on aluminum-ceramic paints with hexavalent chromium compound additives as corrosion inhibitors. However, hexavalent chromium-containing compounds are considered environmental hazards by government agencies around the world. Chromium-free compounds can also lack sufficient corrosion inhibition properties.

Furthermore, cold working processes for aircraft components (e.g., shot peening) will not effectively impart improved mechanical properties to said components when high curing temperatures (e.g., about 190° C. or greater) are used. However, standard industry coatings for aircraft components, and their respective curing temperatures, include ALSEAL 5K (260° C. to 315° C.), NOF Metal Coating GEOMET 321 (288° C. to 315° C.), NOF Metal Coating DACROMET (288° C. to 315° C.), and Praxair SermeTel W (540° C. to 560° C.).

Therefore, there is a need to develop a chromium-free corrosion inhibition coating, combatable with cold working processes, curable at low temperatures, and with equal or better corrosion inhibition properties as compared to conventional hexavalent chromium-containing compounds.

BRIEF DESCRIPTION

Disclosed is a corrosion inhibition coating, comprising: a base comprising a silicate matrix, wherein aluminum, an aluminum alloy, or a combination thereof, is present within the silicate matrix; and an inhibitor comprising: zinc molybdate, cerium citrate, magnesium metasilicate, a metal phosphate silicate, or a combination thereof, wherein a curing temperature of the corrosion inhibition coating is about 20° C. to about 190° C., preferably about 20° C. to about 120° C.

Also disclosed is a substrate coated with the corrosion inhibition coating.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
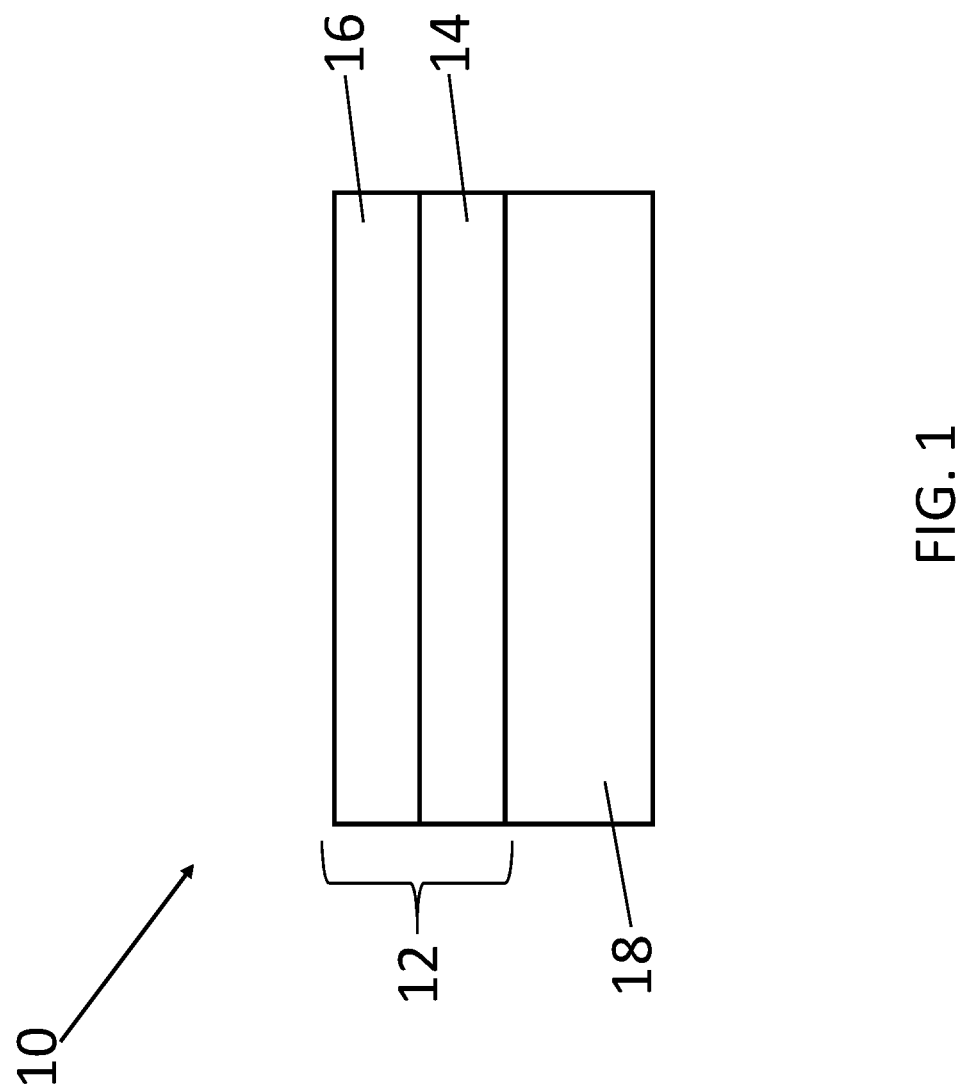
FIG. 1 is a cross-section of a corrosion inhibition coating comprising two distinct layers on a substrate according to an exemplary embodiment.

Referring to FIG. 1, a multilayer structure 10 includes a corrosion inhibition coating 12 coated on a substrate 18. The corrosion inhibition coating 12 can comprise an inhibitor 16 coated on a base 14. The base 14 and the inhibitor 16 can be two distinct layers as shown in FIG. 1. Referring to the multilayer structure 10 of FIG. 2, an inhibitor 16 can be mixed within a base 14 to form a corrosion inhibition coating 12 as a single layer. The corrosion inhibition coating 12 can be coated on the substrate 18.

The corrosion inhibition coating 12 can be a chromium-free corrosion inhibition coating, for example, a chromate-free corrosion inhibition coating, with equal or better corrosion inhibition properties as compared to conventional hexavalent chromium-containing compounds. The corrosion inhibition coating 12 can function in a wide range of applications, environments, and temperatures. The corrosion inhibition coating 12 is also environmentally friendly. The corrosion inhibition coating 12 can inhibit the corrosion of metal, thereby extending the life-time of a substrate 18.

As shown in FIG. 1, for example, the corrosion inhibition coating 12 can comprise a base 14 comprising a matrix and a metal within the matrix. In the coatings disclosed herein, the base can comprise a silicate matrix, wherein aluminum, an aluminum alloy, or a combination thereof, is present within the silicate matrix. For example, the silicate matrix can comprise silicates with low curing temperatures (e.g., less than about 190° C.). For example, the silicate matrix can comprise an alkali metal silicate, for example, sodium silicate, ethyl silicate, potassium silicate, lithium silicate, or a combination thereof. The aluminum alloy present within the silicate matrix can comprise, for example, aluminum-zinc, aluminum-zinc-indium, or a combination thereof.

The corrosion inhibition coating 12 can also comprise an inhibitor 16. For example, the inhibitor 16 can comprise zinc molybdate ($ZnMoO_4$), cerium citrate, for example, trivalent cerium citrate ($C_6H_5CeO_7$), magnesium metasilicate ($MgO_3Si$), and a metal phosphate silicate. The inhibitor 16 can be in the form of a powder.

The corrosion inhibition coating 12 can comprise about 1% to about 99% base 14 by volume and about 1% to about 99% inhibitor 16 by volume. For example, the corrosion inhibition coating 12 can comprise about 70% to about 95% base 14 by volume and about 5% to about 30% inhibitor 16 by volume. The corrosion inhibition coating 12 can comprise about 85% to about 95% base 14 by volume and about 5% to about 15% inhibitor 16 by volume. The corrosion inhibition coating 12 can comprise less than or equal to about 50% inhibitor 16 by volume. For example, the corrosion inhibition coating 12 can comprise less than or equal to about 10% inhibitor 16 by volume.

The inhibitor 16 can comprise about 0% to about 100% zinc molybdate by weight; about 0% to about 100% cerium citrate, for example, trivalent cerium citrate by weight; about 0% to about 100% magnesium metasilicate by weight; and about 0% to about 100% of a metal phosphate silicate by weight. For example, the inhibitor 16 can comprise about 1% to about 50% zinc molybdate by weight; about 1% to about 50% cerium citrate, for example, trivalent cerium citrate, by weight; about 1% to about 50% magnesium metasilicate by weight; and about 1% to about 50% of a metal phosphate silicate by weight. For example, the inhibitor 16 can comprise about 25% zinc molybdate by weight; about 25% cerium citrate by weight; about 25% magnesium metasilicate by weight; and about 25% of a metal phosphate silicate by weight.

The inhibitor 16 can comprise about ⅓ zinc molybdate by weight; about ⅓ magnesium metasilicate by weight; and about ⅓ of a metal phosphate silicate by weight. The inhibitor 16 can comprise about 50% zinc molybdate by weight; and about 50% cerium citrate, for example, trivalent cerium citrate, by weight. The inhibitor 16 can also consist of only four components, namely, the zinc molybdate, the cerium citrate, the magnesium metasilicate, and the metal phosphate silicate. For example, the corrosion inhibition coating 12 can comprise 0% magnesium metasilicate. The corrosion inhibition coating 12 can also comprise 0% chromium.

The metal phosphate silicate of the inhibitor 16 can comprise aluminum phosphate silicate, zinc phosphate silicate, calcium phosphate silicate, strontium phosphate silicate, or a combination thereof.

Figure 2:
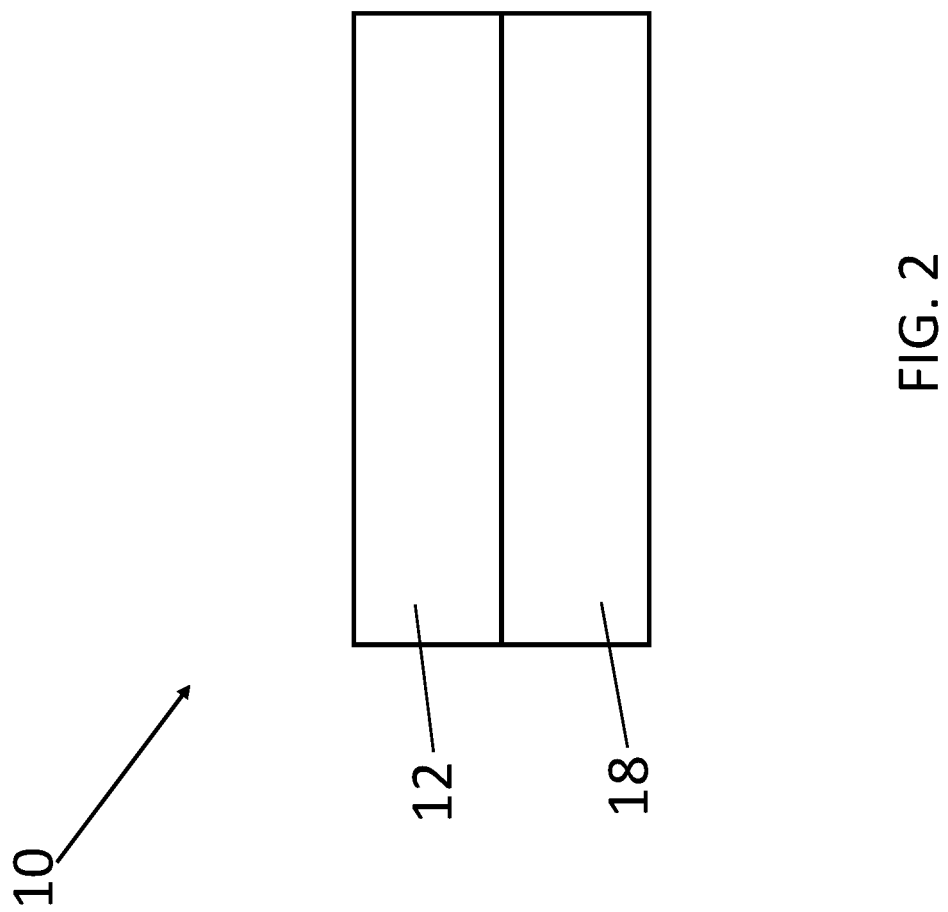
FIG. 2 is a cross-section of a mixed corrosion inhibition coating on a substrate according to an exemplary embodiment.

The inhibitor 16 can be mixed within the base 14, for example so as to form a single layer 12 as shown in FIG. 2. For example, the matrix of the base 14 can serve as the matrix for the inhibitor 16. The base 14 and the inhibitor 16 can also be unmixed, for example so as to form two distinct layers as shown in FIG. 1. In the case where the base 14 and the inhibitor 16 form two distinct layers, the inhibitor 16 can be coated on the base 14 and is thus further from the substrate 18 than the base 14.

In the case where the base 14 and the inhibitor 16 form two distinct layers, the inhibitor 16 can further comprise a second matrix. For example, the inhibitor 16 can comprise about 0% to about 50% zinc molybdate by volume; about 0% to about 50% cerium citrate, for example, trivalent cerium citrate by volume; about 0% to about 50% magnesium metasilicate by volume; and about 0% to about 50% of a metal phosphate silicate by volume, mixed within the second matrix. For example, the second matrix can be greater than or equal to about 50% by volume of the inhibitor 16. For example, the second matrix can comprise silicate, epoxy, ceramic, or a combination thereof. For example, suitable ceramics can include alumina, beryllia, ceria, zirconia, carbide, boride, nitride, and silicide.

The curing temperature of the corrosion inhibition coating 12 will vary depending on the particular matrix used. For example, curing temperatures can be different for silicate, epoxy, and ceramic matrices. Curing duration can also vary with curing temperature. For example, if a higher curing temperature is used, less curing time is required.

In the case where the inhibitor 16 is mixed within the base 14 so as to form a single layer, the corrosion inhibition coating 12 can be cured at a single temperature, corresponding to the matrix used. In the case where the base 14 and the inhibitor 16 form two distinct layers, two different curing temperatures can be used, corresponding to the matrix used for each layer. For example, the base 14 can be cured at a first temperature, followed by addition of the inhibitor 16 and curing at a second temperature. For example, a curing temperature of the corrosion inhibition coating can be about 20° C. to about 190° C., for example, about 20° C. to about 120° C., for example, about 20° C. to about 100° C.

The corrosion inhibition coating 12 can be coated onto a substrate 18, wherein the substrate is a peened part. Shot peening can refer to a cold working process used to produce a compressive residual stress layer and modify mechanical properties of metals and composites. It can entail impacting a surface with shot (e.g., round metallic, glass, or ceramic particles) with force sufficient to create plastic deformation. Peening a surface can spread it plastically, causing changes in the mechanical properties of the surface. It can avoid the propagation of micro cracks from a surface. Such cracks do not propagate in a material that is under a compressive stress; shot peening can create such a stress in the surface.

The substrate 18 can comprise steel, aluminum, zinc, magnesium, alloys of these metals, or a combination thereof. For example, the substrate 18 can comprise alloys of these metals. The corrosion inhibition coating 12 can function in a wide range of applications and environmental temperatures. For example, the substrate 18 can be an aircraft component. For example, the aircraft component can be a propeller blade, a propeller shank, a propeller hub, a propeller barrel, a propeller tulip, a landing gear component, an engine gear, an engine disc, a shaft, for example, an engine shaft, a strut, or a counterweight.

Accordingly, the present disclosure provides a chromium-free corrosion inhibition coating, combatable with cold working processes, curable at low temperatures, and with equal or better corrosion inhibition properties as compared to conventional hexavalent chromium-containing compounds.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components (and encompasses "consist(s) of", "consisting of", "consist(s) essentially of" and "consisting essentially of"), but do not necessarily preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A corrosion inhibition coating composition, comprising:
   a base comprising a silicate matrix, wherein aluminum, an aluminum alloy, or a combination thereof, is present within the silicate matrix; and
   an inhibitor comprising:
   zinc molybdate,
   cerium citrate,
   magnesium metasilicate,
   a metal phosphate silicate, or any combination(s) thereof, wherein a curing temperature of the corrosion inhibition coating composition is about 20° C. to about 190° C.; and wherein the corrosion inhibition coating composition comprises less than or equal to about 10% inhibitor by volume.

2. The corrosion inhibition coating composition of claim 1, wherein the corrosion inhibition coating composition comprises:
about 70% to about 95% base by volume; and
between 5% and 10% inhibitor by volume.

3. The corrosion inhibition coating composition of claim 1, wherein the inhibitor consists of:
zinc molybdate;
cerium citrate;
magnesium metasilicate;
a metal phosphate silicate, or any combination(s) thereof.

4. The corrosion inhibition coating composition of claim 1, wherein the silicate matrix comprises an alkali metal silicate.

5. The corrosion inhibition coating composition of claim 1, wherein the corrosion inhibition coating comprises 0% chromium, 0% magnesium metasilicate, or a combination thereof.

6. The corrosion inhibition coating composition of claim 1, wherein the aluminum alloy comprises aluminum-zinc, aluminum-zinc-indium, or a combination thereof.

7. The corrosion inhibition coating composition of claim 1, wherein the inhibitor is mixed within the base.

8. The corrosion inhibition coating composition of claim 1, further comprising a second matrix, wherein the inhibitor is mixed within the second matrix.

9. A substrate coated with the corrosion inhibition coating composition of claim 1, wherein the substrate is a peened part.

10. The substrate of claim 9, wherein the substrate comprises steel, aluminum, zinc, magnesium, steel alloy, aluminum alloy, zinc alloy, magnesium alloy, or any combination(s) thereof.

11. The substrate of claim 9, wherein the substrate is one of: a propeller blade, a propeller shank, a propeller hub, a propeller barrel, a propeller tulip, a landing gear component, an engine gear, an engine disc, a shaft, a strut, or a counterweight.

12. The corrosion inhibition coating composition of claim 1, wherein the curing temperature of the corrosion inhibition coating composition between 20° C. and 120° C.

13. A corrosion inhibition coating composition, comprising:
a base comprising a silicate matrix, wherein aluminum, an aluminum alloy, or a combination thereof, is present within the silicate matrix; and
an inhibitor comprising:
zinc molybdate,
cerium citrate,
magnesium metasilicate,
a metal phosphate silicate, or any combination(s) thereof,
wherein a curing temperature of the corrosion inhibition coating composition is about 20° C. to about 190° C.;
wherein the inhibitor comprises:
from 1% to 50% zinc molybdate by weight;
from 1% to 50% cerium citrate by weight;
from 1% to 50% magnesium metasilicate by weight; and
from 1% to 50% of a metal phosphate silicate by weight.

14. The corrosion inhibition coating composition of claim 13, wherein the inhibitor comprises:
about 25% zinc molybdate by weight;
about 25% cerium citrate by weight;
about 25% magnesium metasilicate by weight; and
about 25% of a metal phosphate silicate by weight.

15. A corrosion inhibition coating composition, comprising:
a base comprising a silicate matrix, wherein aluminum, an aluminum alloy, or a combination thereof, is present within the silicate matrix; and
an inhibitor comprising:
zinc molybdate,
cerium citrate,
magnesium metasilicate,
a metal phosphate silicate, or any combination(s) thereof,
wherein a curing temperature of the corrosion inhibition coating composition is about 20° C. to about 190° C.;
wherein the base and the inhibitor are two distinct layers.

16. The corrosion inhibition coating composition of claim 15, wherein the inhibitor is coated on the base.

* * * * *